(12) United States Patent
Ovadia et al.

(10) Patent No.: US 6,751,002 B2
(45) Date of Patent: Jun. 15, 2004

(54) METHOD AND APPARATUS FOR SEMICONDUCTOR-BASED INTEGRATED POLARIZATION MODULATOR/COMPENSATOR

(75) Inventors: Shlomo Ovadia, San Jose, CA (US); Ansheng Liu, Cupertino, CA (US); Remus Nicolaescu, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 19 days.

(21) Appl. No.: 10/140,443

(22) Filed: May 6, 2002

(65) Prior Publication Data

US 2003/0206676 A1 Nov. 6, 2003

(51) Int. Cl.[7] .............................. G02F 1/03; G02F 1/07
(52) U.S. Cl. ...................................... 359/246; 359/251
(58) Field of Search ............................ 359/237, 246, 359/251, 325; 385/39, 28, 9

(56) References Cited

U.S. PATENT DOCUMENTS

| | | | |
|---|---|---|---|
| 5,111,517 A | * | 5/1992 | Riviere ........................ 385/11 |
| 5,227,715 A | * | 7/1993 | Ito et al. ....................... 324/96 |
| 5,661,825 A | | 8/1997 | Van Dam et al. |
| 5,838,844 A | | 11/1998 | Van Dam et al. |
| 5,933,554 A | | 8/1999 | Leuthold et al. |
| 6,370,308 B1 | | 4/2002 | Nakazawa et al. |
| 6,374,002 B1 | | 4/2002 | Shekel et al. |
| 2002/0051601 A1 | | 5/2002 | Hung |
| 2002/0089711 A1 | | 7/2002 | Conzone et al. |
| 2002/0191886 A1 | | 12/2002 | Castoldi et al. |
| 2003/0002767 A1 | | 1/2003 | Hanneman, Jr. |

OTHER PUBLICATIONS

"Integrated TE– and TM–pass polarizers", Applied Physics / Integrated Optics: TE– and TM– pass polarizers in lithium niobate, Sep. 3, 1998, http://fb6www.uni–paderborn.de/ag/ag–sol/research/acousto/polari.htm.

(List continued on next page.)

Primary Examiner—Scott J. Sugarman
Assistant Examiner—Richard Hanig
(74) Attorney, Agent, or Firm—Blakely, Sokoloff, Taylor & Zafman LLP (57) ABSTRACT

An optical polarization modulator (OPM) for use in an optical communication system includes two polarizing beam splitters (PBSs) and an adjusting stage coupled between the PBSs. One PBS receives an input optical signal with an arbitrary state of polarization (SOP) and splits it into its TE and TM components. The adjusting stage can change the amplitude and/or relative phase between the TE and TM components to help achieve a desired state of polarization (SOP). The ACS and PCS may include MZIs to both adjust the amplitude and the relative phase difference between the TE and TM components. Alternatively, the OPM may include an amplifier and a phase shifter for each component. The second PBS combines the adjusted components to form the output signal with a desired SOP. Another embodiment of the OPM includes an Y-junction coupler, two plasma optical-effect silicon phase shifter stages, a 2×2 3-dB coupler and a PBS. The Y-junction coupler splits the incoming optical signal into two equal portions (containing TM and TE components). The first stage adjusts the relative phase between the portions. The 2×2 3-dB coupler allows the phase adjusted portions to interact to adjust the amplitude. The second stage adjusts the phase difference between the two portions for TE and TM components and outputs the adjusted portions to the PBS via polarization maintaining fibers. The PBS then combines the TE component of one portion with the TM component of the other portion to form an output signal with the desired SOP.

40 Claims, 6 Drawing Sheets

OTHER PUBLICATIONS

Ranalli, E.R., et al., "Narrow Bandwidth Electrooptic Polarization Modulator Using GaAs Quantum–Well Waveguides", IEE Photonics Technology Letter, Apr. 1999, pp. 320–323, vol. 3 No. 4.

Benedetto, S., et al., "Multilevel Polarization Modulation Using a Specifically Designed $LiNbO_3$ Device", IEEE Photonics Technology Letters, Aug. 1994, pp 949–951, vol. 6 No. 8.

Saida, Takashi , et al., "Planar Lightwave Circuit Polarization Mode Dispersion Compensator", ECOC 2001 paper Mo.F.2.5.

Rajarajan, Muttukrishnan ,et al., "Accurate Analysis of MMI Devices with Two–Dimensional Confinement", Journal of Lightwave Technology, Sep. 1996, pp. 2078–2084, vol. 14 No. 9.

Lorenzo, R.M., et al., "Improved self–imaging characteristics in 1×N multimode couplers", IEEE Proc.–Optoelectron, Feb. 1998, pp. 65–69, vol. 145 No. 1.

Kareenahalli, S., et al., "Experimental Confirmation of Phase Relationships of Multimode Interference Splitters Using a Shearing–Type Near–Field Sagnac Interferometer", IEEE Photonics Technology Letters, Jul. 1997, pp. 937–939, vol. 9. No. 7.

Rasmussen, T., "Design and Performance Evaluation of 1–by–64 Multimode Interference Power Splitter for Optical Communications", Journal of Lightwave Technology, Oct. 1995, pp. 2069–2074, vol. 13 No. 10.

Bachmann, M., et al., "General self–imaging properties in N×N multimode interference couplers including phase relations", Applied Optics, Jun. 20, 1994, pp. 3905–3911, vol. 33 No. 18.

Smit, Meint, K., et al., "PHASAR–Based WDM–Devices: Principles, Design and Applications", IEEE Journal of Selected Topics in Quantam Electronics, Jun. 1996, pp. 236–250, vol. 2 No. 2.

Soldano, Lucas B., et al., "Optical Multi–Mode Interference Devices Based on Self–Imaging: Principles and Applications", Journal of Lightwave Technology, Apr. 1995, pp. 615–627, vol. 13 No. 4.

Erdogan, Turan, "Fiber Grating Spectra," IEEE, Journal of Lightwave Technology, Aug. 1997, pp. 1277–1294, vol. 15, No. 8.

Giles, C.R., "Lightwave Applications of Fiber Bragg Gratings," Journal of Lightwave Technology, Aug. 1997, pp. 1391–1404, vol. 15, No. 8.

Hill, Kenneth O. et al., "Fiber Bragg Grating Technology Fundamentals and Overview," IEEE, Journal of Lightwave Technology, Aug. 1997, pp. 1263–1276, vol. 15, No. 8.

Studenkov, P.V. et al., "Asymmetric Twin–Waveguide $1.55\mu$ Wavelength Laser with a Distributed Bragg Reflector,", IEEE, Photonics Technology Letters, May 2000, pp. 468–470, vol. 12, No. 5.

Sugden, K. et al., "Fabrication and Characterization of Bandpass Filters Based on Concatenated Chirped Fiber Gratings," IEEE, Journal of Lightwave Technology, Aug. 1997, pp. 1424–1432, vol. 15, No. 8.

Willner, A.E., "Tunable Compensation of Channel Degrading Effects Using Nonlinearly Chirped Passive Fiber Bragg Gratings," IEEE, Journal of Selected Topics in Quantum Electronics, Sep./Oct. 1999, pp. 1298–1311, vol. 5, No. 5.

* cited by examiner

METHOD AND APPARATUS FOR SEMICONDUCTOR-BASED INTEGRATED POLARIZATION MODULATOR/COMPENSATOR

CROSS REFERENCE TO RELATED APPLICATIONS

The present invention is related to U.S. patent application Ser. No. 09/811,171 entitled "Method and Apparatus For Steering An Optical Beam In A Semiconductor Substrate" filed Mar. 16, 2001 by A. Liu et al. and to U.S. patent application Ser. No. 10/004,030 entitled "Method and Apparatus Of A Semiconductor-Based Tunable Optical Dispersion Compensation System With Multiple Channels" filed Oct. 19, 2001 by S. Ovadia et al.

FIELD OF THE INVENTION

The field of invention relates to optical communication devices in general; and, more specifically, to optical polarization modulators and compensators.

BACKGROUND

There are various methods to transmit information in fiber-optic communication systems. Some optical communication systems use state of polarization (SOP) modulation to transfer information. In a typical optical SOP system, a polarization modulator is used to control the SOP of an optical signal (i.e., a laser beam) by changing the phase and amplitudes of the optical signal's TE (transverse electrical) and TM (transverse magnetic) components (these components also referred to herein as the TE and TM components). The SOP can be used to achieve multi-level transmission (i.e., where each SOP can represent the value of multiple bits). SOP-based optical communication systems can be substantially insensitive to some nonlinear fiber effects, such as self-phase modulation and polarization dependent gain in some EDFAs (Erbium doped fiber amplifiers).

Some polarization modulators use the thermo-optic effect to modulate the SOP. However, the speed of these thermo-optic based polarization modulators and compensators is relatively slow with typical symbol rates in the kHz range.

Other polarization modulators use Lithium Niobate (LiNbO$_3$) devices, which provide greater symbol rate, but are relatively high in cost, form factor, and difficulty in implementing in an integrated circuit device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
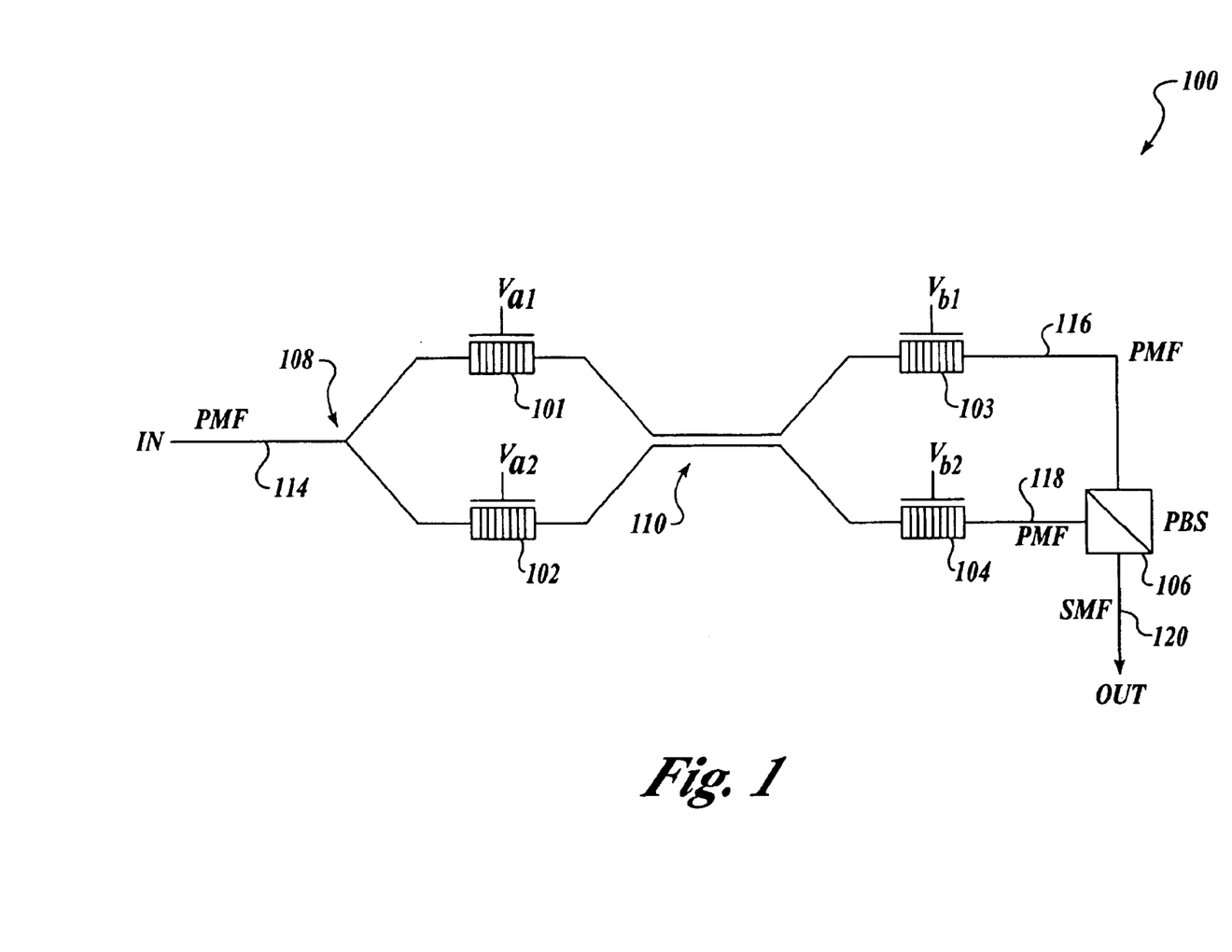
FIG. 1 is a simplified schematic diagram illustrating an optical polarization modulator with controller and other electronic components omitted, according to a first embodiment of the present invention.

FIG. 1 is a simplified schematic diagram illustrating an optical polarization modulator 100, according to a first embodiment of the present invention. In this embodiment, optical polarization modulator 100 includes optical phase control elements 101–104, polarizing beam splitter (PBS) 106, and Y-junction coupler 108, 2×2 3-dB coupler 110 and polarization maintaining fibers (PMF) 114, 116 and 118. In this embodiment, phase control elements 101–104 are silicon based optical phase control elements, implemented as described below in conjunction with FIGS. 2 and 3.

In this embodiment, 2×2 3-dB coupler 110 is used to vary the light intensity of the TE or TM components at the output ports of phase control elements 101 and 102. For example, 2×2 3-dB coupler 110 can be implemented as an evanescent coupler or as a 2×2 multi-mode interference (MMI) device.

The elements of optical polarization modulator 100 are interconnected as follows. One port of Y-junction coupler 108 is connected to PMF 114 to receive a linearly polarized input optical signal. The other two ports of Y-junction coupler 108 are respectively connected to input ports of phase control elements 101 and 102.

Phase control element 101 has an output port connected to one input port of 2×2 3-dB coupler 110 and, similarly, phase control element 102 has an output port connected to the other input port of 2×2 3-dB coupler 110. Phase control elements 101 and 102 are connected to receive a control signal $V_{a1}$ and a control signal $V_{a2}$, respectively. Control signals $V_{a1}$ and $V_{a2}$ controls the induced phase difference between the two arms of the polarization modulator for the TE and TM components of the propagating optical signals after the phase control elements 101 and 102. In one embodiment, control signals $V_{a1}$ and $V_{a2}$ are generated by a radio frequency (RF) signal generators (not shown). In another embodiment, one of phase control elements 101 and 102 does not receive a control signal.

One output port of 2×2 3-dB coupler 110 is connected to an input port of phase control element 103, whereas the other output port of 2×2 3-dB coupler 110 is connected to phase control element 104. Phase control elements 103 and 104 are connected to receive a control signal $V_{b1}$ and $V_{b2}$, respectively. Control signals $V_{b1}$ and $V_{b2}$ control the induced phase shift of the TE and TM components at each arm of the polarization modulator after phase control elements 103 and 104. In one embodiment, control signals $V_{b1}$ and $V_{b2}$ are generated by other RF signal generators (not shown). Thus, the voltage difference $V_{b1}$ and $V_{b2}$ controls the relative phase difference between TE/TM and TM/TE components for the two arms of the polarization modulator.

The output ports of phase control elements 103 and 104 are connected to the input ports of PBS 106 via PMFs 116 and 118, respectively. PBS 106 has an output port connected to a single mode fiber (SMF) 120. As will be described below, phase control elements 103 and 104 and PMFs 116 and 118 are used to control the relative phase difference between the TE and TM components of the output optical signal between the two arms of the polarization modulator.

In operation, Y-junction coupler 108 receives a linearly polarized input optical signal (e.g., a laser beam of about 1550 nanometers) via PMF 114. Y-junction coupler 108 then splits essentially one-half of the input signal power to phase control element 101 and the other half to phase control element 102. Phase control elements 101 and 102 introduce a phase difference between their output signals, depending on control signals $V_{a1}$ and $V_{a2}$ as described below in conjunction with FIG. 2 (with control signals $V_{a1}$ and $V_{a2}$) corresponding to the control signal $V_G$ in FIG. 2).

2×2 3-dB coupler 110 then causes the phase shifted output signals of phase control elements 101 and 102 to interact. Depending on the phase difference introduced by phase control elements 101 and 102, the amplitudes of the signals outputted by 2×2 3-dB coupler 110 are controlled. For example, by introducing a phase difference of $\pi/2$, $-\pi/2$, or $3\pi/2$ radians, allowing the light intensity ratio to be maximized at the output of the 2×2 3-dB coupler. In contrast, by introducing no phase difference, the output signals of 2×2 3-dB coupler 110 would in an ideal system have the same amplitudes as the input optical signals received from phase control elements 101 and 102. Thus, the combination of some or all of Y-junction coupler 108, phase control elements 101 and 102 together with 2×2 3-dB coupler 110 may be referred to as an amplitude control stage (ACS).

The intensities of the optical signals outputted by 2×2 3-dB coupler 110 and directed to phase control elements 103 and 104 (i.e., $I_1$ and $I_2$, respectively) can be represented by the equations:

$$I_1^{(TE,TM)} = E_0^2 \cdot \cos^2[\Delta\phi_0^{(TE,TM)} + \theta^{(TE,TM)}] \quad (1)$$

$$I_2^{(TE,TM)} = E_0^2 \cdot \sin^2[\Delta\phi_0^{(TE,TM)} + \theta^{\%(TE,TM)}] \quad (2)$$

where $E_0$ is the initial electrical amplitude, $\Delta\phi_0^{(TE,TM)}$ is the induced phase shift for the TE and TM modes, $\theta^{(TE,TM)}$ and $\theta^{\%(TE,TM)}$ are the initial phases of the TE and TM modes received by phase control elements 103 and 104, respectively.

Phase control elements 103 and 104 then introduce a phase difference between their output signals, depending on control signals $V_{b1}$ and $V_{b2}$ as described below in conjunction with FIG. 2 (with control signal $V_{b1}$ and $V_{b2}$) corresponding to the control signal $V_G$ in FIG. 2. The amplitudes of output electric field signals after the phase control elements 103 and 104 (i.e., $E_1$ and $E_2$) can be represented, respectively, by the equations:

$$E_1 = E_{1,TE} + E_{1,TM} = E_0[e^{i(\Delta\phi'_0 + \Delta\phi_1 + \theta)} + e^{i(\Delta\phi'_0 + \theta)}] \quad (3)$$

$$E_2 = E_{2,TM} + E_{2,TE} = E_0[e^{i(\Delta\phi''_0 + \Delta\phi_2 + \theta'')} + e^{i(\Delta\phi''_0 + \theta)}] \quad (4)$$

where $\Delta\phi_1$ and $\Delta\phi_2$ are the induced phase shift for the TE and TM components at each arm of the polarization modulator after the phase control elements 103 and 104, respectively; $\Delta\phi'_0$ and $\Delta\phi''_0$ are the initial phases of the TE and TM components when received by phase control elements 103 and 104, respectively. By appropriate control of the control signals $V_{b1}$ and $V_{b2}$, the desired induced phase shift difference, namely $\Delta\phi_1 - \Delta\phi_2 \neq 0$ can be achieved.

PMFs 116 and 118 then propagate the output signals from phase control elements 103 and 104 to PBS 106. PBS 106 is configured so that when it receives the output signal from phase control element 103 via PMF 116, it passes the TE mode to SMF 120 while reflecting the TM mode. In this way, the TM mode from PMF 116 does not contribute to the polarization modulator output signal. Similarly, PBS 106 is configured so that when it receives the output signal from phase control element 104 via PMF 118, it passes the TM mode to SMF 120 while reflecting the TE mode. In this way, the TE mode from PMF 118 does not contribute to the polarization modulator output signal. Thus, PBS 106 combines the TE mode of the output signal of phase control element 103 with the TM mode of the output signal of phase control element 104.

Thus, by appropriate control of control signals $V_{a1}$, $V_{a2}$, $V_{b1}$ and $V_{b2}$, polarization modulator 100 can generate an output signal with any SOP in the SMF 120. In addition, because silicon-based phase control elements are used, polarization modulator 100 has a relatively high symbol rate (in the several GHz range), is more easily implemented in an integrated circuit device, and has a smaller cost and form factor compared to the previously described thermo-optic and $LiNbO_3$ polarization modulators FIG. 2 illustrates a cross-section of optical phase control element 101, according to one embodiment of the present invention. In this embodiment, optical phase control elements 102–104 are essentially identical to optical phase control element 101. In one embodiment, several trench capacitors are formed with polysilicon regions 229 disposed in semiconductor substrate 221. In one embodiment, insulating regions 231 are disposed between polysilicon regions 229 and semiconductor substrate to form trench capacitors.

In one embodiment, the wafer on which phase control element is disposed is a silicon-on-insulator (SOI) wafer. Accordingly, a buried insulating layer 225 is disposed between semiconductor substrate 221 and semiconductor substrate 227 of the SOI wafer. In addition, semiconductor substrate 221 is disposed between buried insulating layer 225 and insulating layer 237. In one embodiment, insulating layer 237 is an interlayer dielectric layer of the wafer on which phase control element 101 is disposed.

In one embodiment, an optical waveguide, such as for example a rib waveguide, is disposed in semiconductor substrate 221 between insulating layers 237 and 225. As such, optical beam 223 is illustrated in FIG. 2 propagating from left to right. In one embodiment, optical beam 223 includes infrared or near infrared laser light. As mentioned, in one embodiment, semiconductor substrate 221 includes silicon. As known to those skilled in the art, silicon is partially transparent to infrared or near infrared light. For instance, in one embodiment in which phase control element 101 is utilized in telecommunications, optical beam 223 has an infrared wavelength in the range of approximately 1300 to 1550 nanometers. In one embodiment, insulating layers 225 and 237 include an oxide material. The oxide material has a smaller index of refraction that silicon and polysilicon; therefore, optical beam 223 is confined within the waveguide between insulating layers 225 and 237 as a result of total internal reflection.

Figure 2:
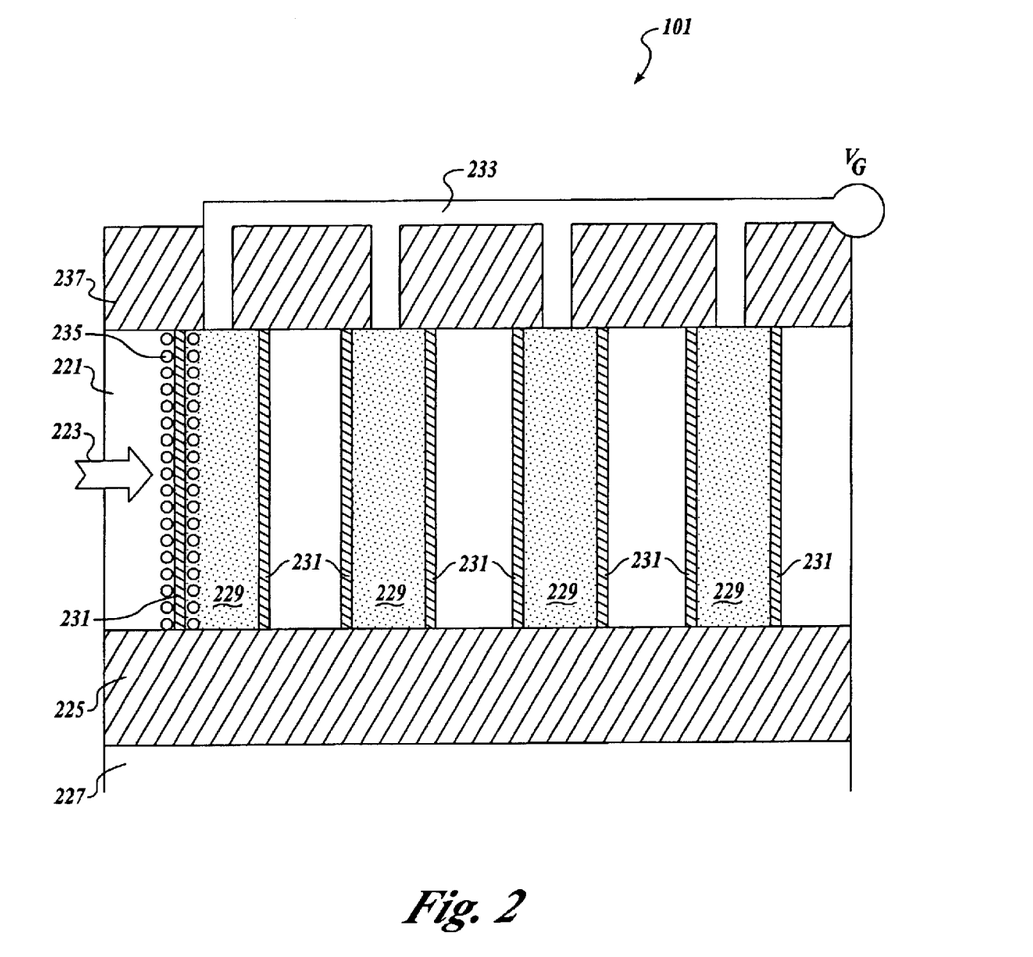
FIG. 2 is a illustrating a cross-section of a plasma optical effect-based silicon phase shifter, according to one embodiment of the present invention.

As shown in the embodiment of FIG. 2, polysilicon regions 229 are coupled to receive a control signal $V_G$ through conductors 233 routed through insulating layer 237. In the depicted embodiment, the trench capacitors formed by polysilicon regions 229 in semiconductor substrate 221 are biased in response the control signal $V_G$ such that the concentration of free charge carriers in charged regions 235 is modulated. For instance, in one embodiment, when control signal $V_G$ is varied, injected free electrons and holes included in charge regions 235 accumulate at the interfaces between the polysilicon regions 229 and insulating regions 231 and at the interfaces between semiconductor substrate 221 and insulating regions 231. Accordingly, as optical beam 223 propagates through the waveguide between insulating layers 225 and 237, optical beam 223 propagates through the modulated charged regions 235.

In one embodiment, the phase of optical beam 223 that passes through the charged regions 235 is modulated in response to control signal $V_G$. In one embodiment, the phase of optical beam 223 passing through free charge carriers in charged regions 235 is modulated due to the plasma optical effect. The plasma optical effect arises due to an interaction between the optical electric field vector and free charge carriers that may be present along the propagation path of the optical beam 223. The electric field of optical beam 223 induces a change in the velocity of the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part, which causes the velocity change and the imaginary part being related to the free charge carrier absorption. In this embodiment, the amount of phase shift $\phi$ is determined using the equation:

$$\phi = (2\pi/\lambda)\Delta n \cdot L \tag{5}$$

where $\lambda$ is the optical wavelength in vacuum and L is the interaction length.

In the case of the plasma optical effect in silicon, the refractive index change $\Delta n$ due to the electron ($\Delta N_e$) and hole ($\Delta N_h$) concentration change (which depends on control signal $V_G$ as described above) is determined in this embodiment using the equation:

$$\Delta n = -\frac{e^2 \lambda^2}{8\pi^2 c^2 \varepsilon_0 n_0}\left(\frac{\Delta N_e}{m_e^*} + \frac{\Delta N_h}{m_h^*}\right) \tag{6}$$

where $n_0$ is the nominal index of refraction for silicon, e is the electronic charge, c is the speed of light $\varepsilon_0$ is the permittivity of free space, $m_e^*$ and $m_h^*$ are the electron and hole effective masses, respectively.

It is noted that four trench capacitors have been illustrated in FIG. 2 for explanation purposes with polysilicon regions 229 disposed in semiconductor substrate 221. Other embodiments may have a greater or fewer number of trench capacitors in accordance with the teachings of the present invention, with the number of trench capacitors chosen to achieve the required phase shift. In particular, the interaction length L discussed in connection with Equation (5) above may be varied by increasing or decreasing the total number of trench capacitors of phase control element 101.

Figure 3:
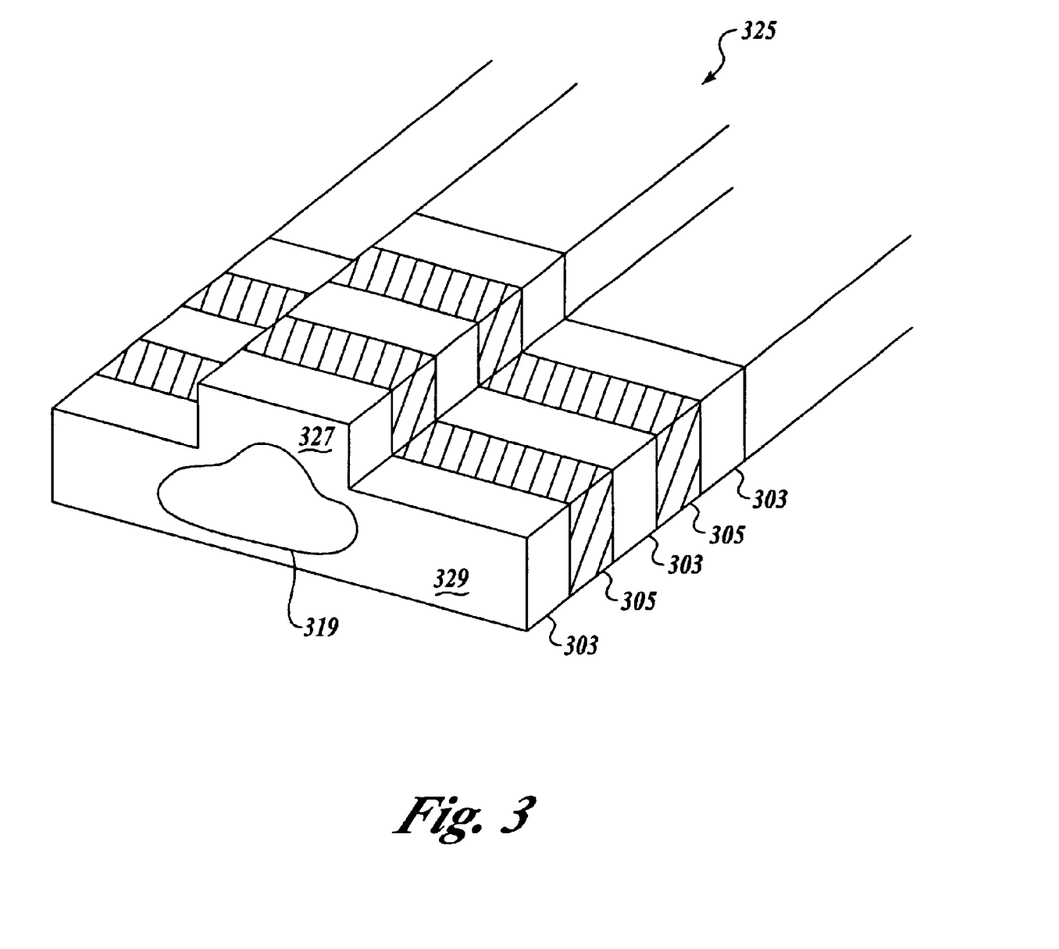
FIG. 3 is a diagram illustrating a perspective view of ridge-waveguide plasma optical-effect silicon phase shifter implementation of the phase shifter depicted in FIG. 2, according to one embodiment of the present invention.

FIG. 3 is a diagram illustrating a perspective view of a portion of silicon-based phase control element that can be used to implement phase control element 101 (FIG. 2), according to one embodiment of the present invention. In this embodiment, the phase control element is implemented using a rib waveguide 325. Rib waveguide 325 is disposed between insulating regions (not shown), similar to insulating regions 225 and 227 in FIG. 2. Conductors 233 (FIG. 2) are also omitted from FIG. 3 for clarity in describing the rib waveguide.

Rib waveguide 325 is disposed in a semiconductor material 303 and includes regions of polysilicon 305. In one embodiment, the semiconductor material 303 has a different index of refraction than polysilicon 305 such that periodic or quasi-periodic perturbations in an effective index of refraction are provided along an optical path through rib waveguide 325.

As shown, rib waveguide 325 includes a rib region 327 and a slab region 329. In the embodiment illustrated in FIG. 3, the intensity distribution 319 of a single mode optical beam is shown propagating through the rib waveguide 325. As shown, the intensity distribution 319 of the optical beam is such that of the majority of the optical beam propagates through a portion of rib region 327 towards the interior of the rib waveguide 325. In addition, a portion of the optical beam propagates through a portion of slab region 329 towards the interior of the rib waveguide 325. As also shown with the intensity distribution 319 of the optical beam, the intensity of the propagating optical mode of the optical beam is vanishingly small at the "upper corners" of rib region 327 as well as the "sides" of slab region 329. This ridge waveguide shape allows rib waveguide 325 to support single mode propagation.

Figure 4:
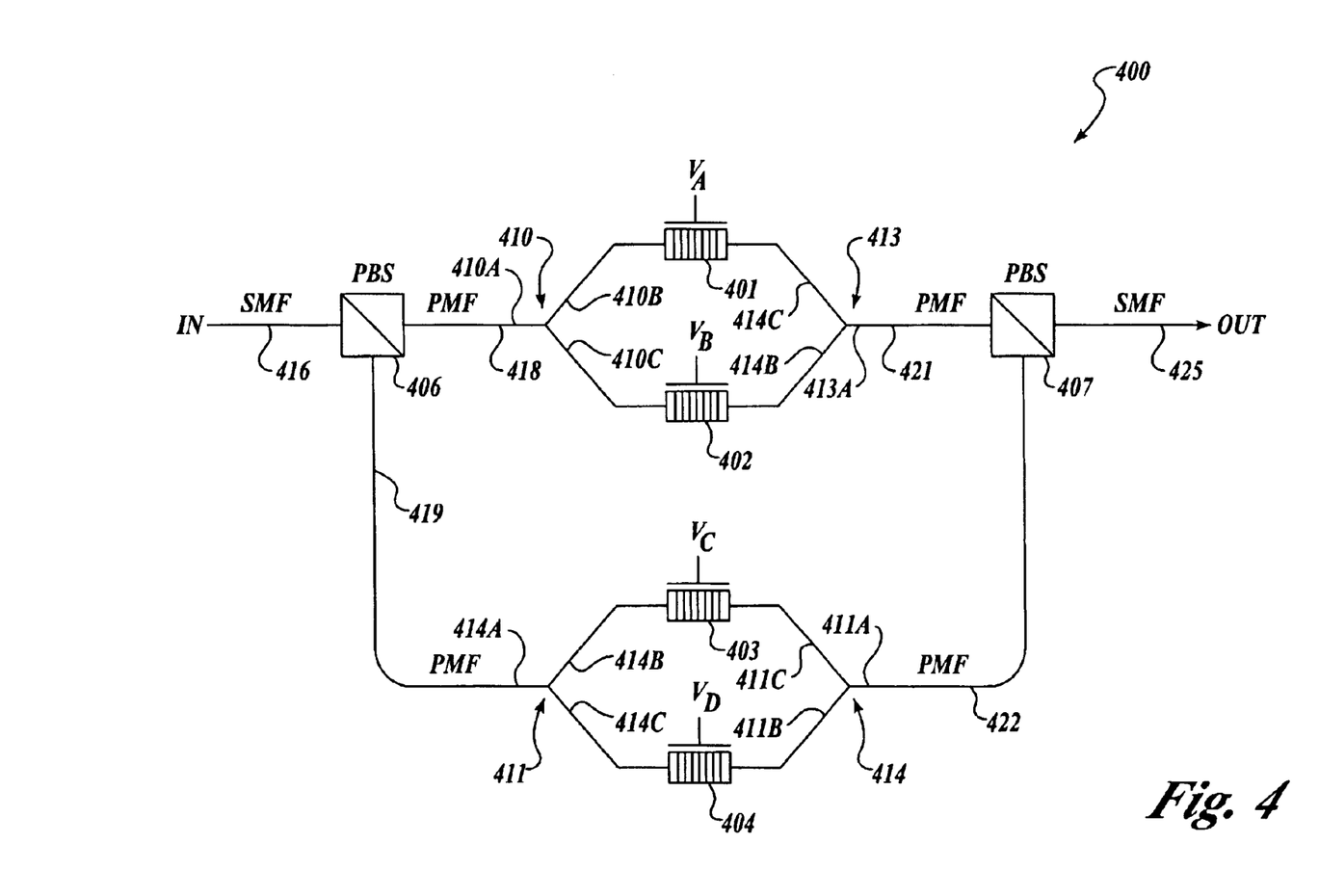
FIG. 4 is a simplified schematic diagram illustrating an optical polarization modulator with controller and other electronic components omitted, according to a second embodiment of the present invention.

FIG. 4 illustrates an optical polarization modulator 400, according to a second embodiment of the present invention. In this embodiment, optical polarization modulator 400 includes the induced phase control elements 401–404, PBSs 406 and 407, 3-dB couplers 410–414, input SMF 416, PMFs 418, 419, 421 and 422, and output SMF 425. In this embodiment, the induced phase control elements 401–404 are plasma optical effect-based silicon phase shifters as described above in conjunction with FIGS. 2 and 3. However, in other embodiments of optical polarization modulator 400, any suitable type of phase control element can be used. For example, other embodiments can use LiNbO$_3$ devices or, alternatively, devices based on the thermo-optic effect. In one embodiment, single-mode waveguides can be used instead of PMFs 418, 419, 421 and 422.

Also, in another embodiment, all or some of the elements that are part of device 400 could be fabricated on a single monolithic or hybrid chip. As an example, PBSs 406 and 407, phase modulators 401–404, Y-junction couplers 410, 411, 413, 414 and the connecting PMFs 418, 419, 421, 422 can be fabricated using the same silicon substrate. In addition, other substrates can be used; e.g., group III-V compound semiconductors.

The elements of optical polarization modulator 400 are interconnected as follows. PBS 406 has an input port connected to input SMF 416, and has one output port connected to an input port 410A of 3-dB coupler 410 via PMF 418. The other output port of PBS 406 is connected to an input port 411A of 3-dB coupler 411 via PMF 419.

An output port 410B of 3-dB coupler 410 is connected to an input port of phase control element 401 via PMF. 3-dB coupler 410 has another output port 410C connected to an input port of phase control element 402 via PMF. The output port of phase control element 401 is connected to an input port 413C of 3-dB coupler 413 via PMF. The output port of phase control element 402 is connected to another input port 413B of 3-dB coupler 413 via PMF. Thus, the induced phase control elements 401 and 402 and 3-dB couplers 410 and 413 form a Mach-Zehnder Interferometer (MZI). Induced phase elements 401 and 402 are connected to receive control signals $V_A$ and $V_B$, respectively. In one embodiment, RF generators (not shown) generate control signals $V_A$ and $V_B$ under processor control (e.g., by a microprocessor or microcontroller executing a software or firmware program). This MZI is also referred to herein as the first MZI.

Similarly, an output port 411B of 3-dB coupler 411 is connected to an input port of phase control element 403 via PMF. 3-dB coupler 411 has another output port 411C connected to an input port of phase control element 403 via PMF. The output port of phase control element 403 is connected to an input port 414C of 3-dB coupler 414 via PMF. The output port of phase control element 404 is connected to another input port 414B of 3-dB coupler 413 via PMF. Thus, the induced phase control elements 403 and 404 and 3-dB couplers 411 and 414 form a second MZI. Induced phase elements 403 and 404 are connected to receive control signals $V_C$ and $V_D$, respectively. In one embodiment, RF generators (not shown) generate control signals $V_C$ and $V_D$ under processor control.

The output port 413A of 3-dB coupler 413 is connected to one input port of PBS 407 via PMF 421, whereas the output port of 3-dB coupler 414A is connected to another input port of PBS 407 via PMF 422. An output port of PBS 407 is connected SMF 425.

In operation, PBS 406 receives an input optical signal via SMF 416, which PBS 406 splits into a TE component and a TM component. In one embodiment, PBS 406 directs the TE component to the first MZI (i.e., the MZI that includes phase control elements 401 and 402 in this example embodiment) via PMF 418. In addition, PBS 406 directs the TM component to the second MZI (that includes phase control elements 403 and 404 in this example embodiment) via PMF 419. In other embodiments, PBS 406 can be configured to direct the TE and TM components to the second and first MZIs, respectively.

In this embodiment, the first MZI then adjusts the intensity or amplitude of the TE component as a function of the difference between control signals $V_A$ and $V_B$, as in a standard MZI. Similarly, the second MZI adjusts the intensity of the TM component as a function of the difference between control signals $V_C$ and $V_D$. The output signals of the first and second MZIs will have a relative phase difference that is a function of the difference between the above differences; i.e., $(V_A - V_B) - (V_C - V_D)$. Thus, the two MZIs can adjust both the intensity of and the relative phase difference between the TE and TM components to achieve any desired SOP when combined by PBS 407 as described below.

The output signal of the first MZI (i.e., the TE component in the above example embodiment) is directed to PBS 407 via PMF 421. Similarly, the output signal of the second MZI (i.e., the TM component in the above example embodiment) is directed to PBS 407 via PMF 422. PBS 407 then combines the TE and TM components and outputs the combined signal via output SMF 425.

Figure 5:
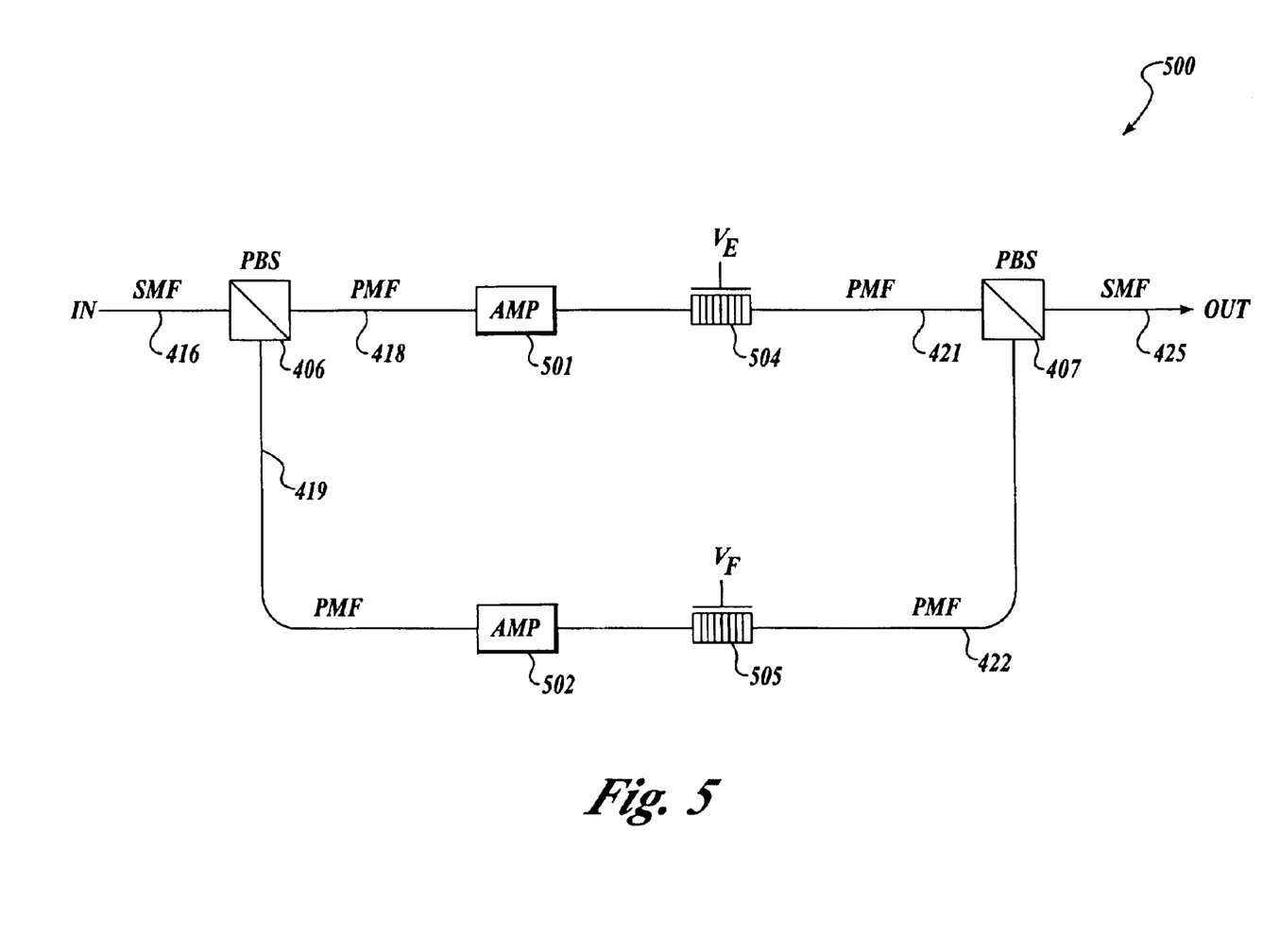
FIG. 5 is a simplified schematic diagram illustrating an optical polarization modulator with controller and other electronic components omitted, according to a third embodiment of the present invention.

FIG. 5 illustrates an optical polarization modulator 500, according to a third embodiment of the present invention. This embodiment includes amplifiers 501 and 502, phase control elements 504 and 505. In one embodiment, amplifiers 501 and 502 are implemented with SOAs (semiconductor optical amplifiers). In addition, this embodiment includes PBSs 406 and 407, input SMF 416, PMFs 418, 419, 421 and 422, and output SMF 425 as described above for optical polarization modulator 400 (FIG. 4).

In this embodiment, phase control elements 504 and 505 are plasma optical effect-based silicon phase shifters as described above in conjunction with FIGS. 2 and 3. However, in other embodiments of optical polarization modulator 400, any suitable type of phase control element can be used. For example, other embodiments can use $LiNbO_3$ devices or alternatively, devices based on the thermo-optic effect.

Input SMF 416 is connected to an input port of PBS 406. One output port of PBS 406 is connected to an input port of amplifier 501 via PMF 418. Another output port of PBS 406 is connected to an input port of amplifier 502 via PMF 419. The output ports of amplifiers 501 and 502 are respectively connected to input ports of phase control elements 504 and 505. In this embodiment, phase control elements 504 and 505 are connected to receive control signals $V_E$ and $V_F$, respectively. In one embodiment, RF signal generators (not shown) generate control signals $V_E$ and $V_F$ under processor control. The output ports of phase control elements 504 and 505 are connected to PBS 407. More specifically, in this example embodiment, the output port of phase control element 502 is connected via PMF 421 to an input port of PBS 407 that passes TE polarized light. Further, the output port of phase control element 505 is connected via PMF 422 to an input port of PBS 407 that passes TM polarized light. One of the output ports of PBS 407 is connected to SMF 425.

This example embodiment of optical polarization modulator 500 operates as follows. PBS 406 receives an input optical signal via SMF 416, which PBS 406 splits into a TE component and a TM component. In this embodiment, PBS 406 directs the TE component to amplifier 501 via PMF 418. In addition, PBS 406 directs the TM component to amplifier 502 via PMF 419. In other embodiments, PBS 406 can be configured to direct the TE and TM components to amplifiers 502 and 501, respectively.

In this embodiment, amplifier 501 adjusts the intensity or amplitude of the TE component as a function of a control signal (not shown). Similarly, amplifier 502 adjusts the intensity of the TM component as a function of another control signal (not shown). The amplified TE and TM components outputted by amplifiers 501 and 502 are then received by phase control elements 504 and 505, respectively. Phase control elements then adjust the phases of the amplified TE and TM components as a function of control signals $V_E$ and $V_F$. Control signals $V_E$ and $V_F$ are generated to achieve the desired relative phase difference. PBS 407 then combines the TE and TM components and outputs the combined signal via output SMF 425.

Also, in another embodiment, all or some of the elements that are part of device 500 could be fabricated on a single monolithic or hybrid chip. As an example PBSs 406 and 407, phase modulators 504 and 505, and the connecting waveguides 418, 419, 421, 422 can be fabricated using the same silicon substrate. Also, other substrates can be used; e.g., group III-V compound semiconductors.

Figure 6:
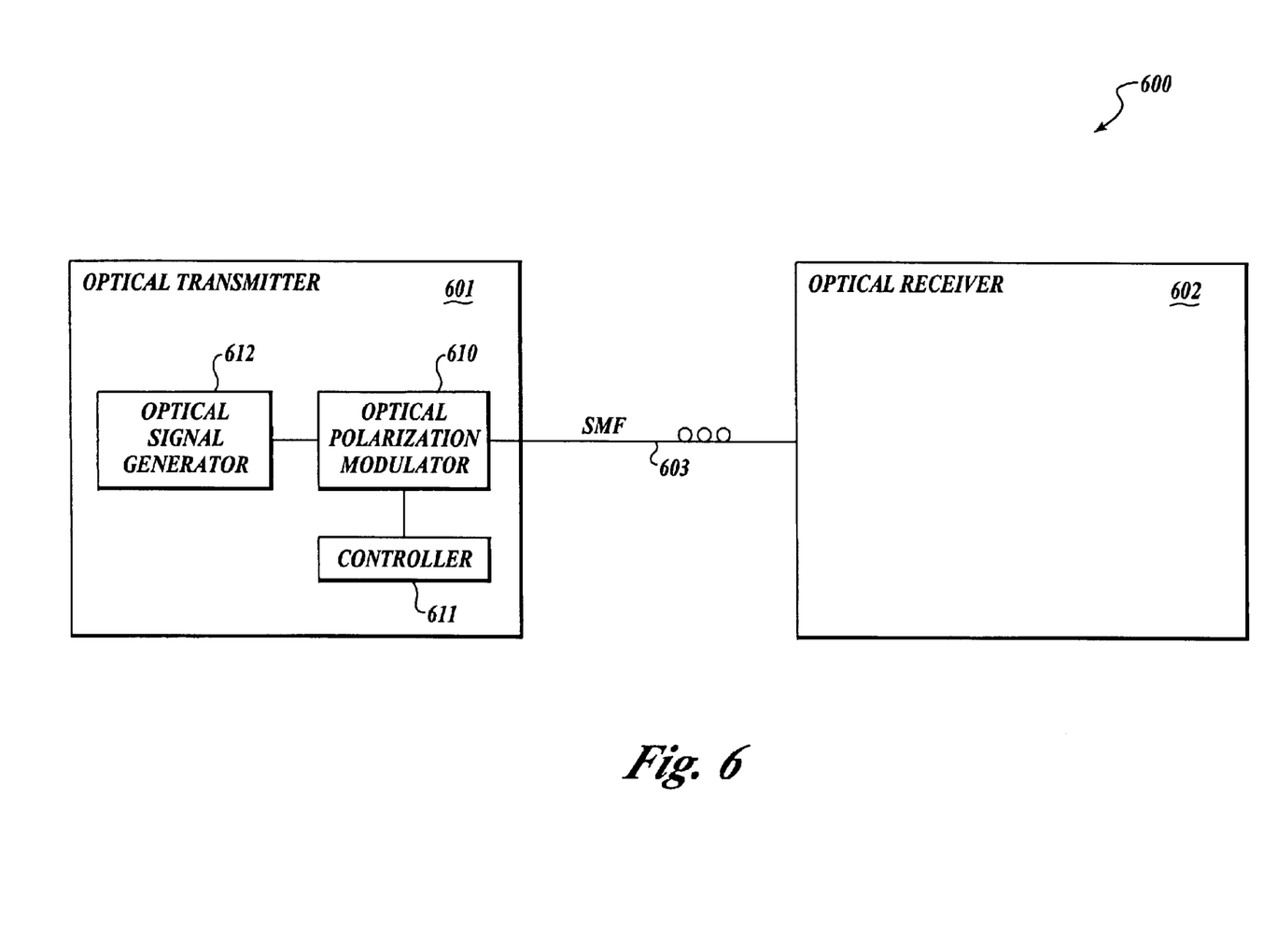
FIG. 6 is a simplified block diagram of an optical communication system using an optical polarization modulator according to one of the embodiments of the present invention.

FIG. 6 illustrates an optical communication system 600, according to one embodiment of the present invention. In this embodiment, optical system 600 includes an optical transmitter 601 connected to an optical receiver 602 via a SMF 603. In addition, optical transmitter 601 includes an optical polarization modulator 610, a controller 611 and an optical signal generator 612 (e.g., a laser). Controller 611 can include a processor (e.g., a microprocessor or microcontroller), along with memory (not shown) used to store instructions and data that are executed and operated by the processor (not shown). Optical transmitter 601 and optical receiver 602 can be part of optical transceivers or optical repeaters in some embodiments. Furthermore, optical transmitter 601 and optical receiver 602 can be part of wavelength-division-multiplexing (WDM) transmission system. In a WDM embodiment, for example, optical transmitter 601 and optical receiver 602 could include optical multiplexer(s) and/or demultiplexer(s) (not shown).

In one embodiment, optical polarization modulator 610 is implemented in the same manner as optical polarization modulator 100 (FIG. 1). In other embodiments, optical polarization modulator 601 is implemented in the same manner as optical polarization modulator 400 (FIG. 4) or optical polarization modulator 500 (FIG. 5).

In operation, optical transmitter 601 receives data to be modulated on an optical signal. In this embodiment, optical transmitter 601 uses optical polarization modulator 610 to transmit symbols that are defined by the SOP of an optical signal outputted by optical signal generator 612. Each symbol can represent one or more bits, depending on the selected modulation format. As previously described, optical polarization modulator 601 can cause the output signal to have any desired SOP in response to received control signals. In this embodiment, controller 611 provides these control signals to optical polarization modulator 610. The symbols are then transmitted to optical receiver 602 via SMF 603.

Embodiments of method and apparatus for implementing an optical polarization modulator are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

In addition, one skilled in the relevant art will recognize that the disclosed polarization modulator embodiments can be easily used as polarization compensators to compensate for polarization mode dispersion.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Machine-readable media also include media having layout information. Furthermore, machine-readable media for semiconductor chip design may be used in a simulation environment to perform the methods of the teachings described above.

Thus, embodiments of this invention may be used as or to support software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical polarization apparatus, comprising:
   a first polarizing beam splitter (PBS) to receive an input optical signal via a first port and to output the input optical signal's TE and TM components via a second port and a third port, respectively;
   an adjusting stage coupled to the second and third ports of the first PBS, the adjusting stage to adjust a relative phase difference between the TE and TM components, the adjusting stage to output the phase adjusted TE and TM components via first and second output ports; and
   a second PBS having first and second ports respectively coupled to first and second output ports of the adjusting stage, the second PBS to combine the phase adjusted TE and TM components to form an output signal via a third port of the second PBS.

2. The apparatus of claim 1 wherein the adjusting stage is coupled to the first and second PBSs via polarization maintaining fibers.

3. The apparatus of claim 1 wherein the adjusting stage includes a first Mach-Zehnder interferometer (MZI) coupled to the second port of the first PBS.

4. The apparatus of claim 3 wherein the first MZI includes plasma optical effect-based silicon phase shifters in first and second arms.

5. The apparatus of claim 3 wherein the adjusting stage includes a second MZI coupled to the third port of the first PBS.

6. The apparatus of claim 5 wherein the first MZI is coupled to receive first and second control signals and the second MZI is coupled to receive third and fourth control signals, the TE and TM components having amplitudes and a relative phase difference that is a function of the first, second, third and fourth control signals.

7. The apparatus of claim 1 wherein the adjusting stage includes an optical amplifier and a phase shifter coupled in series between the second port of the first PBS and the first port of the second PBS.

8. The apparatus of claim 7 wherein the phase shifter comprises a plasma optical effect-based silicon phase shifter.

9. The apparatus of claim 7 wherein the amplifier comprises a semiconductor optical amplifier.

10. A method for adjusting a polarization of an optical signal, the method comprising:
    receiving an input optical signal;
    separating the input optical signal into TE and TM components;
    adjusting a relative phase difference between the TE and TM components after separating the input optical signal into the TE and TM components; and
    combining the phase adjusted TE and TM components.

11. The method of claim 10 further comprising adjusting an amplitude of the TE component and the TM component before combining the phase adjusted TE and TM components.

12. The method of claim 11 wherein a first Mach Zehnder Interferometer (MZI) is used to adjust an amplitude of the TE component and a second MZI is used to adjust an amplitude of the TM component.

13. The method of claim 12 wherein the first and second MZIs are also used to adjust the relative phase difference between the TE and TM components.

14. The method of claim 12 wherein the first and second MZIs each include a plasma optical effect-based silicon phase shifter.

15. The method of claim 11 wherein a first amplifier and a first phase shifter are used to adjust the amplitude and phase of the TE component and a second amplifier and a second phase shifter are used to adjust the amplitude and phase of the TM component.

16. The method of claim 15 wherein the first and second phase shifters are plasma optical effect-based silicon phase shifters.

17. An optical communication system, comprising a receiver, a transmitter and an optical fiber coupled between the receiver and transmitter, the transmitter including:
an optical signal generator to generate an optical signal;
a first polarizing beam splitter (PBS) to receive the optical signal from the optical signal generator via a first port and to output the optical signal's TE and TM components via a second port and a third port, respectively;
a phase adjusting stage (PAS) coupled to the second and third ports of the first PBS, the PAS to adjust a relative phase difference between the TE and TM components, the PAS to output the phase adjusted TE and TM components via first and second output ports;
a second PBS having first and second ports respectively coupled to first and second output ports of the PAS, the second PBS to combine the phase adjusted TE and TM components to form an output signal via a third port of the second PBS coupled to an end of the optical fiber; and
a controller coupled to the PAS.

18. The system of claim 17 wherein the PAS is coupled to the first PBS and the second PBS via polarization maintaining fibers.

19. The system of claim 17 wherein the PAS includes a first Mach-Zehnder interferometer (MZI) coupled to the second port of the first PBS and a second MZI coupled to the third port of the first PBS.

20. The system of claim 19 wherein the first MZI includes first and second arms each having a plasma optical effect-based silicon phase shifter.

21. The system of claim 20 wherein the first MZI is coupled to receive first and second control signals from the controller and the second MZI is coupled to receive third and fourth control signals from the controller, the TE and TM components having amplitudes and a relative phase difference that is a function of the first, second, third and fourth control signal.

22. The system of claim 17 wherein the PAS includes an optical amplifier and a phase shifter coupled in series between the second port of the first PBS and the first port of the second PBS.

23. The system of claim 17 wherein the system is a wavelength division multiplexing system.

24. The system of claim 17 wherein the phase shifter comprises a plasma optical effect-based silicon phase shifter.

25. An optical polarization apparatus, comprising:
an amplitude control stage (ACS), wherein the ACS is configurable to receive an optical signal, wherein the ACS is configurable to adjust a relative phase between two portions of the optical signal and allow the portions to interact to adjust the two portions' amplitude, wherein the ACS includes at least a first plasma optical effect-based phase shifter;
a phase control stage (PCS) coupled to the ACS, the PCS to adjust a relative phase difference between the two portions, wherein the PCS includes at least a second plasma optical effect-based phase shifter;
a polarizing beam splitter (PBS) coupled to the PCS, the PBS to combine a TE component of one portion with a TM component of the other portion to form an output signal of the apparatus.

26. The apparatus of claim 25 wherein the PCS is coupled to the PBS via polarization maintaining fibers.

27. The apparatus of claim 25 wherein the ACS further includes a Y-junction coupler having an output port coupled to an input port of the first plasma optical effect-based phase shifter and further includes a 2×2 3-dB coupler having an input port coupled to the first plasma optical effect-based phase shifter.

28. The apparatus of claim 27 wherein the 2×2 3-dB coupler comprises an evanescent coupler.

29. The apparatus of claim 27 wherein the 2×2 3-dB coupler comprises a multi-mode interference (MMI) device.

30. The apparatus of claim 27 wherein the ACS further includes a third plasma optical effect-based phase shifter coupled to the 2×2 3-dB coupler and the Y-junction coupler, and the PCS further includes a fourth plasma optical effect-based phase shifter coupled to the 2×2 3-dB coupler and the PBS.

31. A method for adjusting a polarization an optical signal, the method comprising:
receiving an input optical signal;
separating a first portion and a second portion from the received input signal;
adjusting a phase difference between the first and second portions using at least a first plasma optical effect-based phase shifter;
after adjusting the phase difference, interacting the first and second portions to adjust the amplitude of the first and second portions;
after interacting the first and second portions, adjusting a phase difference between the first and second portions using at least a second plasma optical effect-based phase shifter; and
combining a TE component of the first portion with a TM component of the second portion.

32. The method of claim 31 wherein the first plasma optical effect-based phase shifter is used to adjust a phase of the first portion and a third plasma optical effect-based phase shifter is used to adjust a phase of the second portion.

33. The method of claim 31 wherein after interacting the first and second portions, the second plasma optical effect-based phase shifter is used to adjust a phase of first portion and a fourth plasma optical effect-based phase shifter is used to adjust a phase of the second portion.

34. An optical transmitter, comprising:
an optical signal generator to generate an optical signal;
an amplitude control stage (ACS) coupled to receive the optical signal, the ACS to adjust a relative phase between two portions of the optical signal and to interact the two portions to adjust the two portions' amplitudes, wherein the ACS includes at least a first plasma optical effect-based phase shifter;
a phase control stage (PGS) coupled to the ACS, the PCS to adjust a relative phase difference between the two portions, wherein the PCS includes at least a second plasma optical effect-based phase shifter;
a polarizing beam splitter (PBS) coupled to the PCS, wherein the PBS is configurable to combine a TE component of one portion with a TM component of the other portion to form an output signal of the optical transmitter; and a controller, coupled to the optical transmitter and the PAS, to provide control signals to the PCS and the ICS to control the phase difference adjustment.

35. The transmitter of claim 34 wherein the PCS is coupled to the PBS via polarization maintaining fibers.

36. The transmitter of claim 34 wherein the ACS further includes a Y-junction coupler having an output port coupled to an input port of the first plasma optical effect-based phase shifter and further includes a 2×2 3-dB coupler having an input port coupled to the first plasma optical effect-based phase shifter.

37. The transmitter of claim 36 wherein the ACS further includes a third plasma optical effect-based phase shifter coupled to the 2×2 3-dB coupler and the Y-junction coupler, and the PCS further includes a fourth plasma optical effect-based phase shifter coupled to the 2×2 3-dB coupler and the PBS.

38. The transmitter of claim 36 wherein the 2×2 3-dB coupler comprises an evanescent coupler.

39. The transmitter of claim 36 wherein the 2×2 3-dB coupler comprises a multi-mode interference (MMI) device.

40. The transmitter of claim 36 wherein the transmitter is part of a wavelength division multiplexing system.

* * * * *